UNITED STATES PATENT OFFICE.

WILLIAM N. BLAKEMAN, JR., OF NEW YORK, N. Y.

PIGMENT AND PROCESS OF MAKING SAME.

SPECIFICATION forming part of Letters Patent No. 726,623, dated April 28, 1903.

Application filed June 9, 1902. Serial No. 110,756. (No specimens.)

*To all whom it may concern:*

Be it known that I, WILLIAM N. BLAKEMAN, Jr., of the borough of Manhattan, in the city, county, and State of New York, have invented a new and useful Pigment and Process of Making the Same, which invention is fully set forth in the following specification.

The object of this invention is to treat zinc pigments used in the manufacture of paints in such a manner that the characteristic of "spreading power" will be imparted to those pigments which wholly lack this characteristic and increased in those pigments which partly possess it. Spreading power is that characteristic which enables a pigment to form a stringy, tenacious, and honey-like compound when ground in a suitable vehicle, so that when applied as a paint it will follow the brush and present an even, smooth, and uniform film, and this characteristic is either partly or entirely lacking in all pigments except white lead made by the old Dutch process. My investigations in the matter have resulted in the discovery that this spreading power of Dutch white lead is a mere physical condition and that this physical condition is its great aggregation, (as contradistinguished from segregation, the physical condition of nearly all other pigments,) owing to hydrated oxid of lead which it contains in combination, and that it is not wet by oil, but is repellent to oil, and hence exhibits great spreading power—sometimes called "body"—when ground in oil. I have, moreover, discovered that this characteristic of spreading power can be imparted to all pigments, whether their condition be crystalline, comminuted, or amorphous, by incorporating a hydrated oxid (or hydroxid) with the pigment before it is ground in a vehicle to form a paint. The hydroxids which may be used embrace those of zinc, lead, manganese, and aluminium, and such other metallic or earthy hydroxids as may be found suitable for use. Where only one hydroxid is used, I prefer to employ hydroxid of zinc.

The pigments which may be treated by my process embrace all those zinc pigments which are partly or wholly deficient in spreading power, such as oxid of zinc or zinc-white, carbonate of zinc, and zinc sulfid or oxysulfid.

In carrying out my process I take, for example, from two to five parts of hydroxid of zinc and incorporate this with one hundred parts of pigment—say zinc-white. This incorporation may be effected with both the hydroxid and the pigment in a dry condition or with either or both in a wet condition. I have obtained the best results by employing the hydroxid in a gelatinous, flocculent, pulpy, or pasty condition, and after further extending or attenuating it in water saturating the dry pigment with this solution, agitation or other suitable means being employed to effect thorough incorporation of the hydroxid with the pigment. I then thoroughly evaporate the water-vehicle, using a gentle heat if necessary. This will leave the zinc-white pigment in a dry condition, with the two to five parts of hydroxid of zinc incorporated therewith, each particle of the pigment being coated with a thin film of the hydroxid. The zinc pigment so produced will when ground in a suitable vehicle to form a paint be found to possess spreading power equal, if not superior, to that possessed by Dutch-process white lead.

Any of the other zinc pigments above named may be treated in a similar manner with satisfactory results. Two or more hydroxids may be used if deemed advisable. The percentage of hydroxid employed may be varied as practice shall dictate; but from two to five parts to one hundred parts of pigment will be found to give good results.

The quantity of the volatile vehicle employed for attenuating the hydroxid should be sufficient to wet the pigment thoroughly and spread the hydroxid in its attenuated condition over the pigment, so as to enable thorough incorporation to be effected. It will, however, be understood by those skilled in the art that the hydroxids used may be so manufactured that they will themselves carry so much water of suspension or flotation that they will be in a sufficiently thin or attenuated condition to be incorporated with the pigment by precipitation or otherwise without requiring the use of any other attenuating vehicle.

Having thus fully described my invention, I claim—

1. As a new article of manufacture, a zinc pigment having hydroxid of zinc incorporated therewith.

2. As a new article of manufacture, a pigment composed of oxid of zinc having hydroxid of zinc incorporated therewith.

3. As a new article of manufacture, a zinc pigment having hydroxid of zinc and an additional hydroxid incorporated therewith.

4. As a new article of manufacture, a pigment composed of oxid of zinc, having hydroxid of zinc and an additional hydroxid incorporated therewith.

5. The process herein described, which consists in incorporating with a zinc pigment, hydroxid of zinc.

6. The process herein described, which consists in incorporating with a zinc pigment, hydroxid of zinc in a gelatinous condition.

7. The process herein described, which consists in incorporating with oxid-of-zinc pigment, hydroxid of zinc.

8. The process herein described, which consists in incorporating with oxid-of-zinc pigment, hydroxid of zinc in a gelatinous condition.

9. The process herein described, which consists in incorporating with a zinc pigment, by the aid of a volatile vehicle, hydroxid of zinc, and then evaporating the vehicle.

10. The process herein described, which consists in incorporating with oxid-of-zinc pigment, by the aid of a volatile vehicle, hydroxid of zinc, and then evaporating the vehicle.

11. The process herein described, which consists in incorporating with a zinc pigment, hydroxid of zinc and an additional hydroxid.

12. The process herein described, which consists in incorporating with oxid-of-zinc pigment, hydroxid of zinc and an additional hydroxid.

WM. N. BLAKEMAN, JR.

Witnesses:
FRANCIS P. REILLY,
ALICE B. VALLIANT.